United States Patent
Pao et al.

(10) Patent No.: US 6,694,437 B1
(45) Date of Patent: Feb. 17, 2004

(54) SYSTEM AND METHOD FOR ON-DEMAND ACCESS CONCENTRATOR FOR VIRTUAL PRIVATE NETWORKS

(75) Inventors: Lih-Gwo Pao, Taipei (TW); Wei-Yuan Do, Chung Ho (TW); Isaac Yi-Yuan Lee, Pan Chiao (TW)

(73) Assignee: Institute for Information Technology, Taipei (TW)

( * ) Notice: Subject to any disclaimer, the term of this patent is extended or adjusted under 35 U.S.C. 154(b) by 0 days.

(21) Appl. No.: 09/338,229

(22) Filed: Jun. 22, 1999

(51) Int. Cl.$^7$ .......................... G06F 11/30; H04L 9/00; H04K 1/00
(52) U.S. Cl. .................. 713/201; 713/153; 713/168
(58) Field of Search .................. 713/200, 201, 713/151, 153, 154, 168, 182

(56) References Cited

U.S. PATENT DOCUMENTS 5,894,557 A * 4/1999 Bade et al. .................. 709/228
6,487,598 B1 * 11/2002 Valencia ..................... 709/227
6,496,491 B2 * 12/2002 Chuah et al. ................ 370/331

* cited by examiner

*Primary Examiner*—Gilberto Barrón
*Assistant Examiner*—Courtney D. Fields

(57) ABSTRACT

Two stages of PPP negotiations are adopted for users to access a virtual private network (VPN). The access concentrator for providing PPP connections is designed to provide the two-stage connection. In the first stage, a user is verified as an authenticated VPN user, and a first network address is assigned. In the second stage, a service requested by the authenticated user is decoded for determining either the service being a VPN service or a non-VPN service. If the service is a non-VPN service, the request is processed by reference to the network address. Otherwise, a second PPP negotiation is executed between the access concentrator and a server in a VPN, and then the server of the VPN assigns the user a VPN address for providing VPN service.

9 Claims, 3 Drawing Sheets

SYSTEM AND METHOD FOR ON-DEMAND ACCESS CONCENTRATOR FOR VIRTUAL PRIVATE NETWORKS

BACKGROUND OF THE INVENTION

A. Field of the Invention

The present invention generally relates to an access concentrator for communicating virtual private networks, and more particularly to an on-demand access concentrator capable of providing users of virtual private networks with various choices of services before connecting to a server of the user's company.

B. Description of the Prior Art

A virtual private network (VPN) 19 is a private data network that makes use of the public telecommunication infrastructure as illustrated in FIG. 1. A company or corporation14 can use a wide-area network 15 as a single large local area network via a contracted internet service provider (ISP) 13. A VPN user 11 may connect to the VPN 19 via the ISP 13 using Point-to-Point Tunneling Protocol (PPTP). PPTP is an extension of the Internet's protocol that allows companies or corporations to extend their own corporate network through private tunnels 16 over the public Internet 15. With PPTP, any user of a PC with PPP client support is able to dial-up PSTNs 12 to connect to an ISP 13 and then connect securely to a server 14 elsewhere in the user's VPN 19. Consequently, a company no longer needs to lease its own lines for wide-area communication but can securely use the public Internet 15.

The ISP 13 uses an Access Concentrator 17 and a database 18 for handling the communications of VPNs. The Access Concentrator 17 provides two interfaces: a VPN interface 171 for providing point-to-point access using PSTN or ISDN lines, and an Internet interface 172 for providing TCP/IP protocol to pass traffic to the Internet 15 or non-VPN.

PPTP uses an enhanced GRE (Generic Routing Encapsulation) mechanism to provide a flow- and congestion-controlled encapsulated datagram service for carrying PPP packets. When a user 11 of a corporation uses PPTP and dials up to the ISP 13, the packets will be encapsulated and then sent to the Access Concentrator 17. The encapsulated PPP packets will be carried over IP. Thus, the data format for the encapsulated packet is illustrated in FIG. 2. It includes a Media header 21, an IP header 22, a GRE header 23, and then the PPP packet 24.

A conventional Access Concentrator 17 will simply check the authenticity of the dial-up user from the call ID of the PPP packet and then assign a legal network address as a source address for the authenticated user to access the VPN without actually decrypting the PPP packets. In other words, the ISP 13 allows the dial-up user 11 to directly perform PPP negotiation with the server 14 in the user's company. Consequently, if the dial-up user simply wants to browse the World Wide Web, or using TELNET, FTP, he still has to connect -to the server 14 of the VPN 19. This is undesirable because connecting to a remote server needs more time and traffic.

Besides, based on the current architecture of an Access Concentrator, if we want to add the on-demand function to a conventional Access Concentrator, the software must be complied with the architecture of RADIOU Service (Remote Authentication Dial-In User). In other words, the PPP itself has to be modified to support EAP standard (PPP extensible authentication, RFC 2284) in addition to the modification on the authentication architecture of RADIUS. That would require additional costs in implementation and programming.

SUMMARY OF THE INVENTION

Accordingly, it is an object of the present invention to provide a system and method for an Access Concentrator to provide on-demand functions, so that a VPN user may request a non-VPN service to the Access Concentrator without having to access the server of the VPN.

It is another object of the present invention to provide a system and method for an Access Concentrator to provide on-demand functions, which is easy to implement and requires very little program revision, thereby to reduce the implementation costs and time.

In accordance with the invention, a system and method for on-demand Access Concentrator is provided for Virtual Private Networks. The invention involves in performing two steps of PPP negotiations. And before the second PPP negotiation is performed, an on-demand service is provided for the dial-up user to choose. The first PPP negotiation is performed between a host machine of a dial-up user and an Access Concentrator. In the first PPP negotiation, the authenticity of the dial-up user will be checked. If the dial-up user is authentic, the dial-up user will be assigned with a new network address. Then, the dial-up user is free to choose a VPN service or a non-VPN service, such as FTP, TELNET, WWW, or BBS. If the dial-up user requests a non-VPN service, the Access Concentrator will simply forward the packets of the dial-up user to their destinations. If the dial-up user requests a VPN service, a second PPP negotiation between the host machine of the dial-up user and a VPN server will be established. If the second PPP negotiation is successful, the dial-up user will be assigned with a legal VPN network address to access the VPN. Consequently, the dial-up user can access non-VPN service without having to directly connect to a VPN server.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

Figure 1:
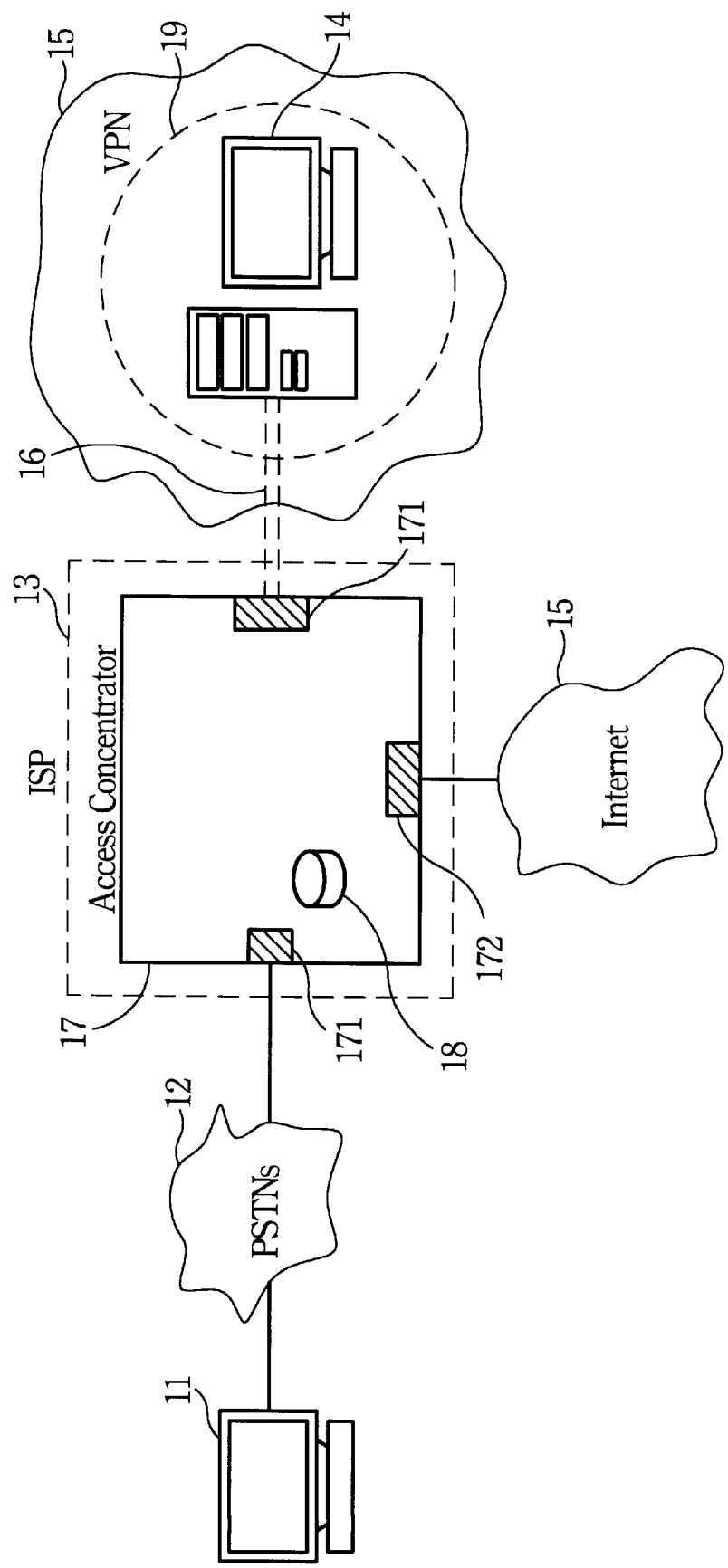
FIG. 1 is a schematic diagram showing the conventional VPN system.
Figure 2:
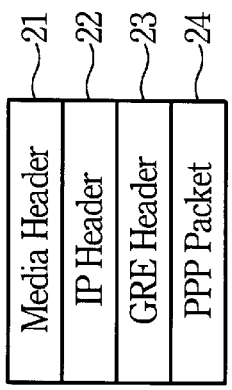
FIG. 2 is a schematic diagram showing the data format of an encapsulated PPP packet.
Figure 3:
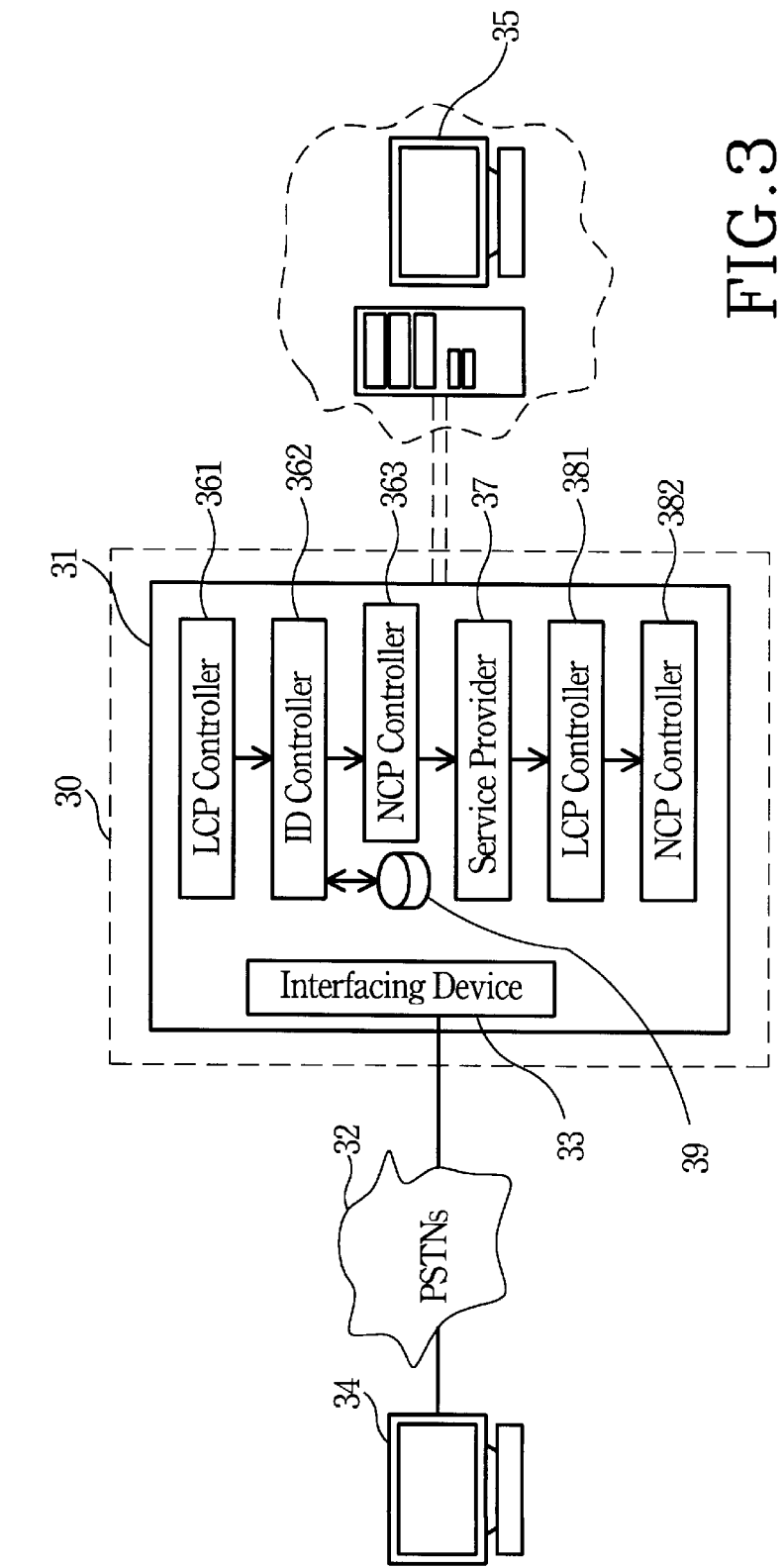
FIG. 3 illustrates the system of an Access Concentrator which supports on-demand functions according to the preferred embodiment of the present invention.

FIG. 3 illustrates the system of an Access Concentrator which supports on-demand functions according to the preferred embodiment of the present invention. The Access Concentrator 31 operates on a dial access platform and can control access for dial-in circuit switched calls originating from a PSTN or ISDN 32 or to initiate outbound circuit-switched connections.

The Access Concentrator 31 also provides Physical native interfacing device 33 to connect to public switch telephone networks (PSTNs) 32. After the remote user dials in and requests a Link layer negotiation with the ISP 30, the Link-layer Control Protocol (LCP) Controller 361 performs a PPP Link Control Protocol for the remote user 34 to connect to the ISP 30. Then, an ID controller 362 performs PPP authentication by looking up the VPN user database 35 and confirms if the source address, rights, user ID, and password recorded on the packets are authenticate. If the user 34 is a legal VPN user, the PPP negotiation continues to perform network layer negotiation using network layer control protocol. In contrast to simply forwarding the PPP packets, the Network Control Protocol (NCP) controller 363 decrypts the packets to get the network address and service request information from the packets. After the PPP negotiation is complete, the remote user 34 will be assigned with a network address provided by the Access Concentrator 31, such as an IP address. The designated IP address is different from the registered IP address of the user's VPN server 35 so that the user does not have to connect to the VPN server 35 first before using other resources provided by the Access Concentrator 31. The NCP controller 363 also determines the routing protocol for the packets.

Then, after the first PPP negotiation is complete, the packets with a new network address will be transferred to the service provider 37. The service provider 37 provides on-demand services for the user 34 to choose. With the new IP address, the dial-up user is free to choose various types of non-VPN service, such as TELNET, FTP, BBS and WWW. If the user 34 chooses non-VPN services, the service provider 37 will directly forward those packets to their destinations without having to connect to the VPN server 35 in the user's company. On the other hand, if the user 34 chooses VPN service, the second PPP negotiation with the company's server will be established. In the second PPP negotiation, the LCP controller 381 can adopt the user information from the first LCP negotiation, so the connection can be established in a short time. Then, the packets will be transferred to the NCP controller 382 for establishing a network layer communication with the VPN server 35. At this time, the user 11 gets a legal network address assigned by the VPN server 35 of the user's company, such as an IP address or an IPX address, so that the user can access the resources in the VPN server 35.

Figure 4:
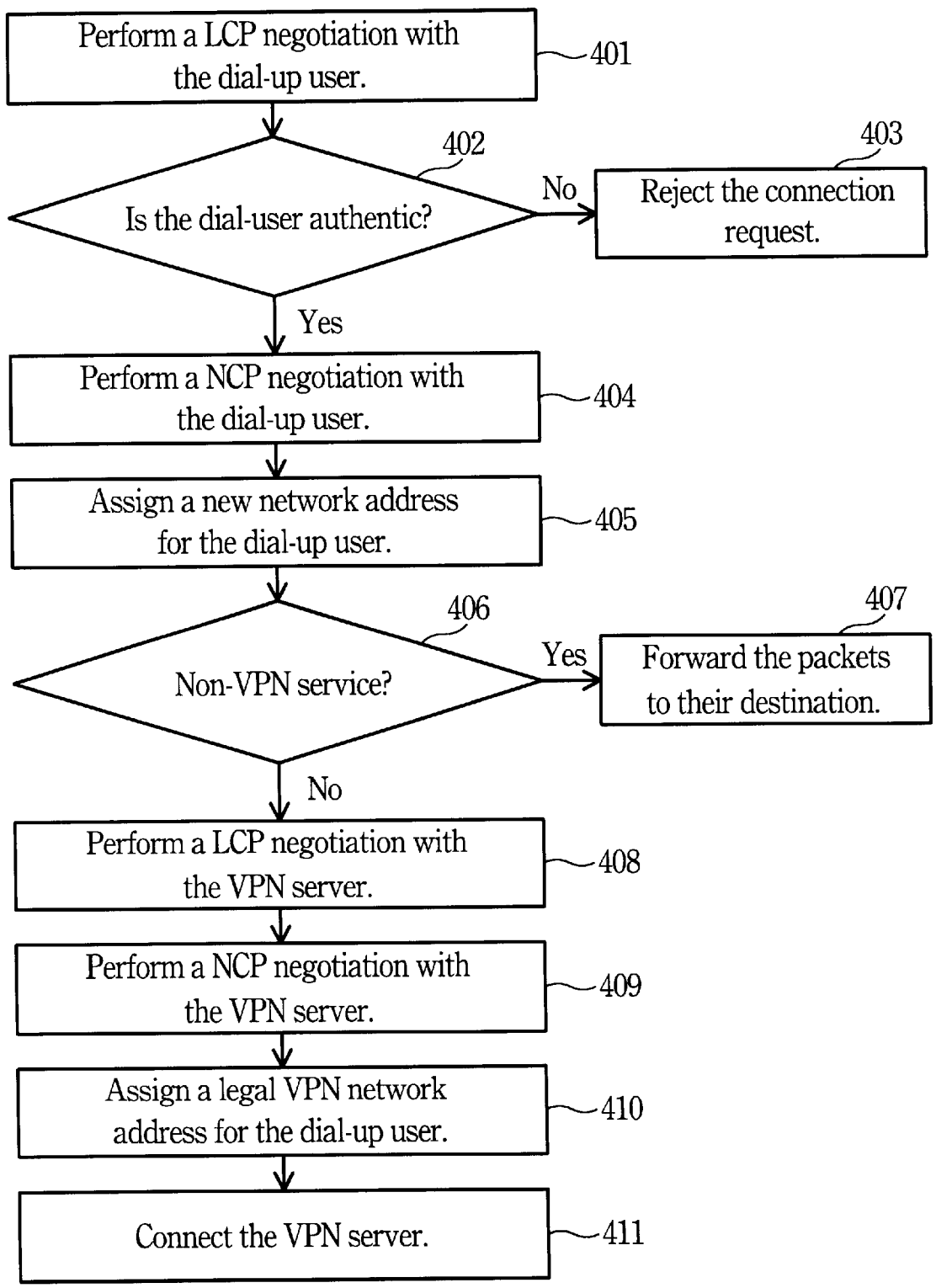
FIG. 4 is a flow chart schematically showing the method of the present invention.

Refer to FIG. 4 for showing the method of the invention based on the system as illustrated in FIG. 3. The inventive method comprises the following steps:

401: perform an LCP negotiation with the dial-up user upon receiving a connection request;

402: check the authenticity of the dial-up user by looking up a VPN user database. If the dial-up user is authenticated, go to step 404. Otherwise, go to step 403.

403: reject the connection request.

404: perform an NCP negotiation with the dial-up user, including decrypting the PPP packets to get the network address and service request information from the PPP packets;

405: assign a new network address for the dial-up user;

406: provide an on-demand menu for the dial-up user to choose. If the user requests a non-VPN service, go to step 407. If the user requests a VPN service, go to step 408.

407: forward the packets to their destinations if the dial-up user chooses a non-VPN service, such as TELNET, FTP, BBS and WWW;

408: perform an LCP negotiation with the VPN server based on the information obtained from the first LCP negotiation;

409: perform a NCP negotiation with the VPN server;

410: assign a legal VPN network address to the dial-up user, such as an IP address or an IPX address;

410: connect the VPN server.

A preferred embodiment has been described in detail hereinabove. It is to be understood that the scope of the invention also comprehends embodiments different from the one described, yet within the scope of the claims. For example, the PPP negotiation protocol can be modified if there is any similar protocol available in the future for VPN connections. Also, the on-demand menu is not limited to FTP, FTP, BBS and WWW. Any new service may be added into the menu anytime when appropriate.

It should be understood that various alternatives to the structures described herein may be employed in practicing the present invention. It is intended that the following claims define the invention and that the structure within the scope of these claims and their equivalents be covered thereby.

What is claimed is:

1. A method for an Access Concentrator to provide on-demand services for Virtual Private Network (VPN) subscribers, comprising the steps of:

performing a first PPP negotiation with a host machine of a dial-up user when receiving a connection request from said dial-up user;

determining the authenticity of said dial-up user by looking up a VPN user database to check whether said dial-up user within said VPN user database;

assigning a network address to said dial-up user when said dial-up user is determined to be authentic;

performing a NCP negotiation to determine either said dial-up user demanding VPN services or non-VPN services;

if said dial-up user demanding a non-VPN service, providing the non-VPN service to said dial-up user by reference to said network address; and if said dial-up user demanding a VPN-service, performing a second PPP negotiation with a VPN server and assigning a legal VPN network address for said dial-up user to access said VPN server.

2. The method as claimed in claim 1, further comprising the step of:

building a database for storing VPN user information.

3. The method as claimed in claim 1, further comprising the step of:

rejecting said first PPP negotiation when said dial-up user is determined to be authentic.

4. The method as claimed in claim 1, wherein said network address is an IP address.

5. The method as claimed in claim 1, wherein said non-VPN service comprises:

TELNET, FTP, WWW, and BBS.

6. The method as claimed in claim 1, wherein said legal VPN network address is an IP address.

7. The method as claimed in claim 1, wherein said legal VPN network address is an IPX address.

8. The method as claimed in claim 1, further comprising the step of:

forwarding packets of said dial-up user to their destinations when said dial-up requests a non-VPN service.

9. The method as claimed in claim 1, wherein said second PPP negotiation is based on user information obtained from said first PPP negotiation.

* * * * *

UNITED STATES PATENT AND TRADEMARK OFFICE
CERTIFICATE OF CORRECTION

PATENT NO. : 6,694,437 B1
DATED : February 17, 2004
INVENTOR(S) : Lih-Gwo Pao et al.

It is certified that error appears in the above-identified patent and that said Letters Patent is hereby corrected as shown below:

<u>Title page,</u>
Item [73], Assignee, should read -- Institute for Information Industry --.

Signed and Sealed this

Sixth Day of September, 2005

JON W. DUDAS
*Director of the United States Patent and Trademark Office*